United States Patent

[11] 3,576,976

| [72] | Inventors | Frank A. Russo<br>Royal Oak;<br>Robert J. Valek, Farmington, Mich. |
|---|---|---|
| [21] | Appl. No. | 676,586 |
| [22] | Filed | Oct. 19, 1967 |
| [45] | Patented | May 4, 1971 |
| [73] | Assignee | The Bendix Corporation |

[54] NONLINEAR OPTIMIZING COMPUTER FOR PROCESS CONTROL
7 Claims, 5 Drawing Figs.

[52] U.S. Cl. ................................................. 235/150.1, 340/146.3
[51] Int. Cl. .................................................. G05b 13/02, G06k 9/06
[50] Field of Search ........................................ 235/150.1, 151.1; 340/146.3

[56] References Cited
UNITED STATES PATENTS
3,435,422  3/1969  Gerhardt et al................ 235/150.1(X)
3,460,096  8/1969  Barron .......................... 235/150.1(X)

OTHER REFERENCES
"Learning Machines" by Nilsson 1965 Q335N5, page 25.

*Primary Examiner*—Eugene G. Botz
*Attorneys*—James L. O'Brien and Plante, Arens, Hartz, Smith and Thompson ABSTRACT: An apparatus for converting an input signal representing a set of measured process parameters such as temperature, vibration or torque into an output signal representing a set of nonmeasurable process performance parameters such as tool wear, surface finish or production costs having a pattern recognition circuit for classifying the measurable parameters into one of a plurality of classes and a linear regression network for each class being selectable in accordance with the classification to calculate the performance parameters.

Pattern Recognition Network

PATENTED MAY 4 1971 3,576,976

Linear Regression Circuit

Pattern Recognition Circuit

INVENTORS
Robert J. Valek,
BY Frank A. Russo

James L. O'Brien
ATTORNEY.

NONLINEAR OPTIMIZING COMPUTER FOR PROCESS CONTROL

CROSS-REFERENCE TO RELATED APPLICATIONS

Application of Ronald Center and Jerome M. Idelshon entitled "Adaptive Control System For Numerically Controlled Machine Tool," Ser. No. 391,549, filed Aug. 24, 1964, and assigned to the assignee of the present invention

BACKGROUND OF THE INVENTION

1. Field of Invention

Systems for controlling processes and more particularly control apparatus for optimizing processes.

2. Description of Prior Art

The present invention is an improvement over the control system disclosed in the application of Ronald Center and Jerome M. Idelshon entitled "Adaptive Control System for Numerically Controlled Machine Tool," Ser. No. 391,549, filed Aug. 24, 1964.

Modern industry has found numerous applications for automatic process controllers. Basically, an automatic process controller adjusts the controllable input parameters of a process according to a predetermined program. The controllable input parameters for a cutting operation may be cutter position, cutter spindle speed and cutter feed rate. The program is predetermined using empirical data which correlates these controllable input parameters with desired performance parameters or indicators such as surface finish, tool wear rate and production costs. Since there are additional factors which effect the performance parameters such as material hardness and porosity which cannot be fully accounted for by empirical techniques, optimum performance is not always achieved. Ideally, the performance parameters should be measured during the process and appropriate adjustment to the controllable input parameters should be made to provide optimum performance. However, many performance parameters such as surface finish and tool wear rate cannot be measured during the process therefore it becomes necessary to correlate parameters which can be measured with the desired performance parameters such that a basis for optimizing the process is provided. The system disclosed in the aforementioned application calculates performance parameters from measurable parameters. The calculations performed in that system are linear, that, it is presumed that the relationships between the measurable parameters and the nonmeasurable parameters are linear.

SUMMARY OF THE INVENTION

The present invention provides an optimizing control system which operates in a nonlinear mode. This is accomplished by providing a control system having a pattern recognition network in combination with a linear regression network or other known function generating network. The pattern recognition network classifies a set of measurable parameters into one of a plurality of classes, each of which corresponds to an approximated linear relationship or other simple functional relationship between the measurable parameters and nonmeasurable parameters, and provides a classification code signifying the selected class. Both the classification code from the pattern recognition network and the measurable parameters are sent to the linear regression network for weighting and summing operations according to the classification code which operations implement the relationship corresponding to the selected class to provide an output signal representing the performance parameter. More particularly, an input pattern formed by the measured parameters is sent to the control system by a plurality of sensors or transducers. For example, in a milling operation the magnitudes of spindle torque, tool temperature and tool vibration may be used as the input pattern. The pattern recognition network classifies the pattern into one of a predetermined number of classes, for example, one of eight classes.

After classification by the pattern recognition network, a code signal signifying the appropriate class is sent to a function generating network. The function generating network may be a linear regression network consisting of a plurality of individual regression circuits each representing a linear function corresponding to a particular class. The incoming measured parameters are switched according to the classification code to the appropriate linear regression circuit for processing thereby providing an output which represents the calculated performance parameter. For example, in the milling process described above, this performance parameter may be surface finish, tool wear rate or cost of machining. Several performance parameters may be obtained through time sharing of the performance computer. These calculated performance parameters may be used in an optimizing computer which compares the calculated values with optimum values and provides appropriate instructions to the process controller for adjusting the controllable input parameters such as cutter spindle speed or feed rate to achieve process optimization.

BRIEF DESCRIPTION OF DRAWINGS

FIG. 5 is a schematic diagram of a linear regression circuits used in the nonlinear performance computer of FIG. 2.

DETAILED DESCRIPTION OF THE PREFERRED EMBODIMENT

Figure 1:
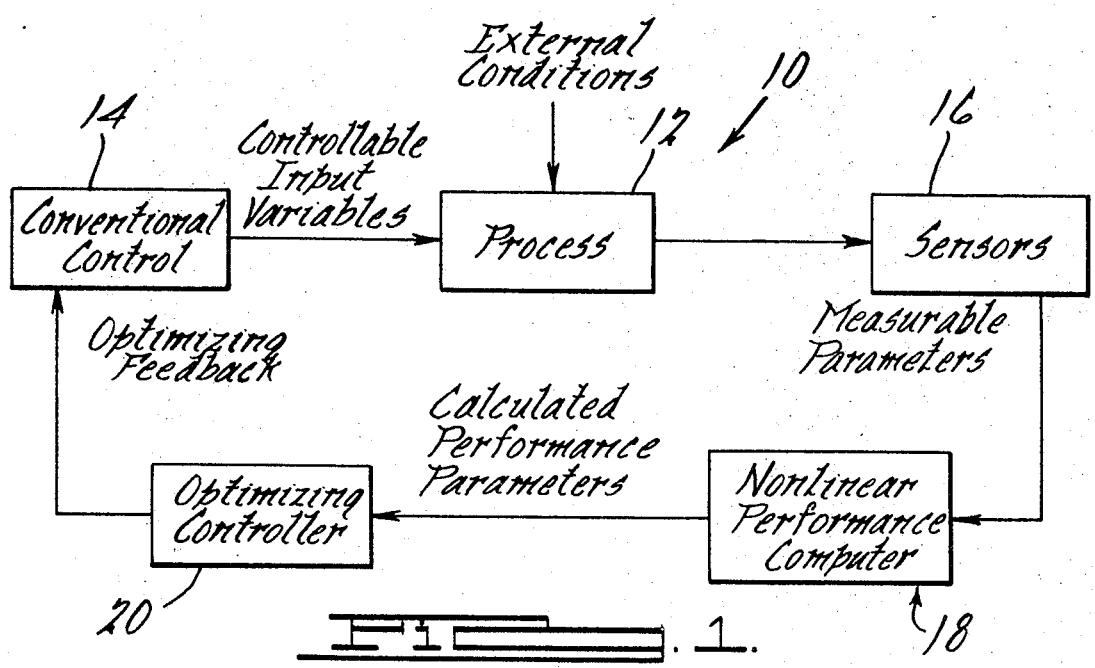
FIG. 1 is a schematic diagram of a process controller utilizing a nonlinear performance computer according to this invention.

In FIG. 1, a block diagram of a process optimizing control system 10 is shown. The controllable input variables are the variables normally used to control the process and are implemented through a conventional control apparatus 14. For instance, these may be cutter spindle speed, feed rate and position control. Each process is also subject to a number of uncontrollable inputs designated as external conditions. These may be workpiece metalurgy or environmental conditions. A plurality of sensors or transducers 16 are provided to measure preselected measurable or available parameters of the process and provide an analog or digital output signal which is representative of these parameters. The parameters referred to may be workpiece temperature, spindle torque and vibration.

As indicated in FIG. 1, the process is subject to control by an optimizing feedback loop between the sensors 16 and the conventional control 14. The feedback loop comprises a nonlinear performance computer 18 and an optimizing controller 20. The nonlinear performance computer 18 receives an input signal representative of the measurable parameters from the sensors 16. The computer 18 calculates nonmeasurable performance parameters using the measurable parameter input. Its output, a signal representing a calculated performance parameter is sent to the optimizing controller 20. The optimizing controller 20 compares the calculated performance parameter to desired performance standards. The optimizing controller 20 is programmed to provide an optimizing feedback signal which represents optimizing adjustments in the controllable input variables. The adjustments are programmed to offset detrimental performance effects of uncontrollable external conditions. Therefore, upon implementation of the adjustments, the process will approach optimum performance such as a desired surface finish quality at the lowest production cost.

Figure 2:
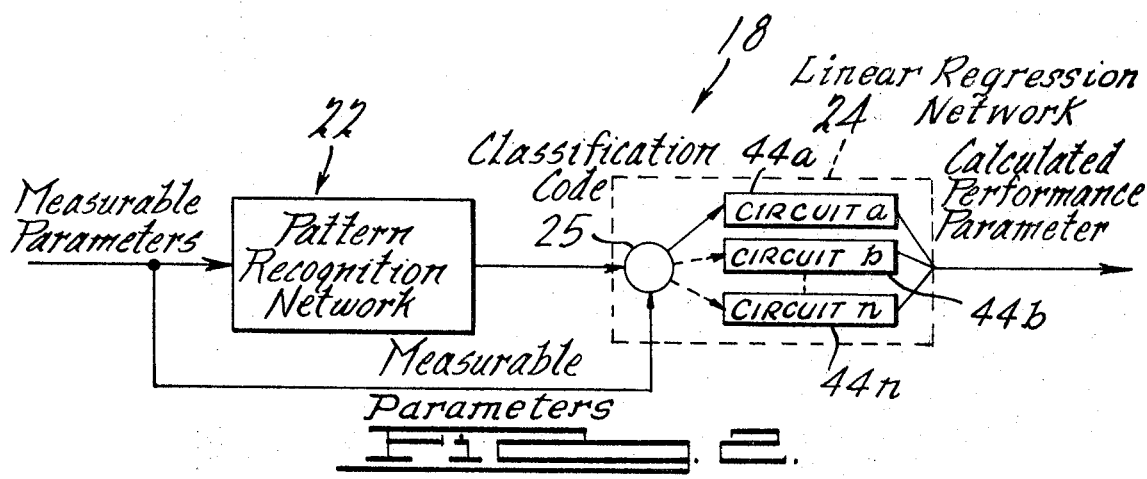
FIG. 2 is a schematic diagram of the nonlinear performance computer illustrated in FIG. 1.

In FIG. 2, the nonlinear performance computer 18 according to the present invention is shown which is capable of nonlinear operations. As such, it is ideally suited for converting a signal representing measurable parameters to a signal representing calculated performance parameters where a nonlinear functional relationship exists between the two.

The performance computer 18 of FIG. 2 comprises a pattern recognition network 22 in combination with a linear regression network 24. A signal from the sensor 16 representing the measurable parameters is sent to the pattern recognition network 22 for classification. The pattern recognition network 22 classifies the measurable parameter into one of a plurality of classes in accordance with the pattern formed by the parameters and provides a classification code signifying the selected class. A pattern recognition network embodying eight classes has been found satisfactory for most applications. More accuracy can at times be obtained by using a greater number of classes. However, the probability of a misclassification increases as the number of classes increases.

The signal representing the measurable parameters and the classification code from the pattern recognition network 22 are sent to the linear regression network 24. The network 24 includes a plurality of linear regression circuits 44a, 44b...44n. A switching device 25, controlled by the Classification Code 18 which comprises the output of the pattern recognition network, acts to switch the measurable parameters from the sensors 16 to a particular one of the linear regression circuits. Thus, one set of the measurable parameters, as identified by a particular classification code, will be routed through a certain one of the linear regression circuits; a different set of parameters having a different pattern will be routed through a different circuit. Although this invention is described with respect to a linear regression network, any known function generating network may be employed.

The combination of a pattern recognition network with a known function generating network such as a linear regression network provides an accuracy of calculation not obtainable with either network used alone. By first classifying the measurable parameters into one of the plurality of classes, each corresponding to an approximated linear relationship between the measured parameters and the calculated parameter, and then performing a linear regression on the parameters according to the classification a nonlinear function relationship between the measurable parameters and the calculated performance parameters can be closely approximated.

Figure 3:
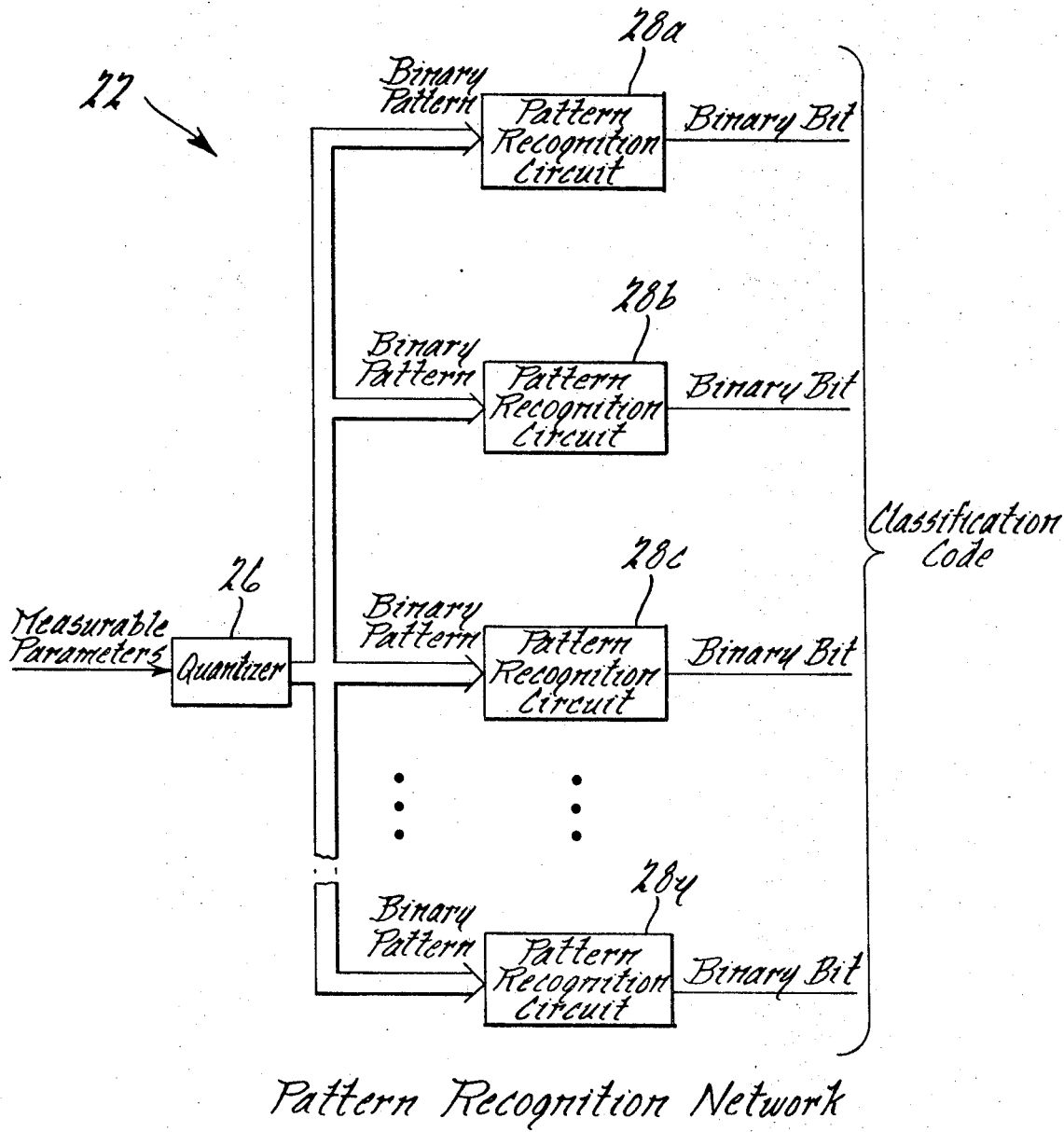
FIG. 3 is a schematic diagram of the pattern recognition network used in the nonlinear performance computer of FIG. 2.
Figure 3:
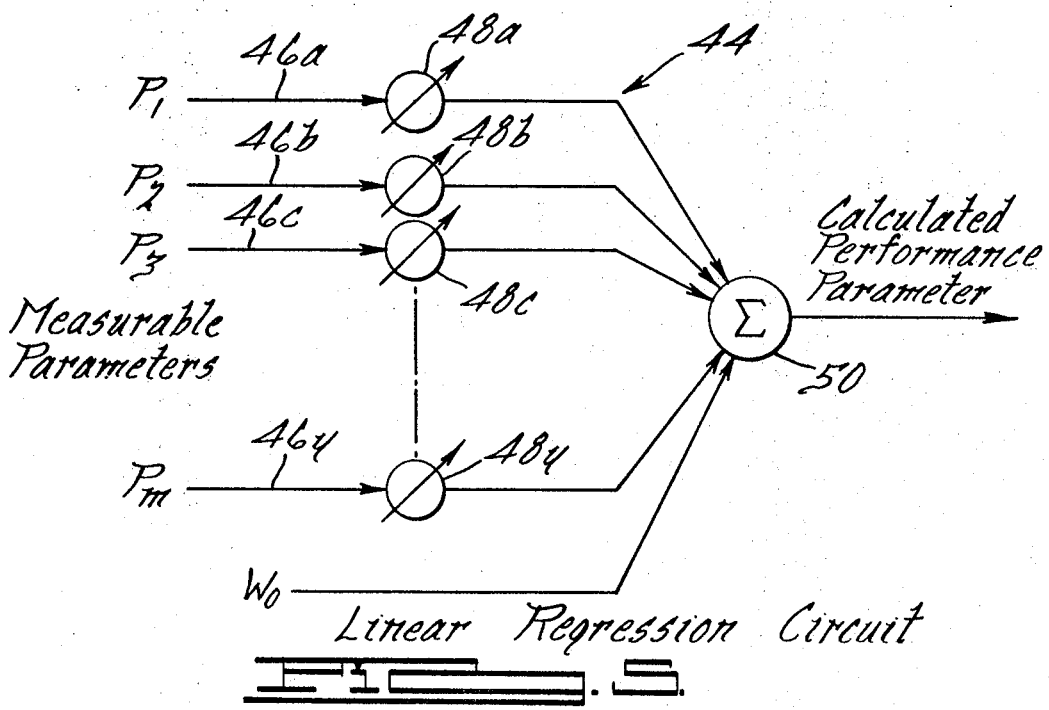

In FIG. 3, a schematic diagram of a pattern recognition network is shown comprising a quantizer 26 and a plurality of pattern recognition circuits 28. The parameter quantizer 26 is essentially a filter which extracts significant data from the measurable parameters and generates a binary pattern containing only significant data. More particularly the quantizer encodes the values of the various parameters according to statistically determined quantization levels. The quantization levels are the values at which the bits of the pattern representing the parameters undergo transitions. For example, a given bit of a binary pattern is a logic one if the measured parameter is greater and/or equal to the quantitazation level associated with the bit. The bit is a logic zero if the measured parameter is less than the quantitazation level associated with the bit. The result is a binary pattern which contains only significant data. The binary pattern is then applied to each pattern recognition circuit 28. Each pattern recognition circuit provides a single binary bit. The combination of the bits represents the classification code.

Figure 4:
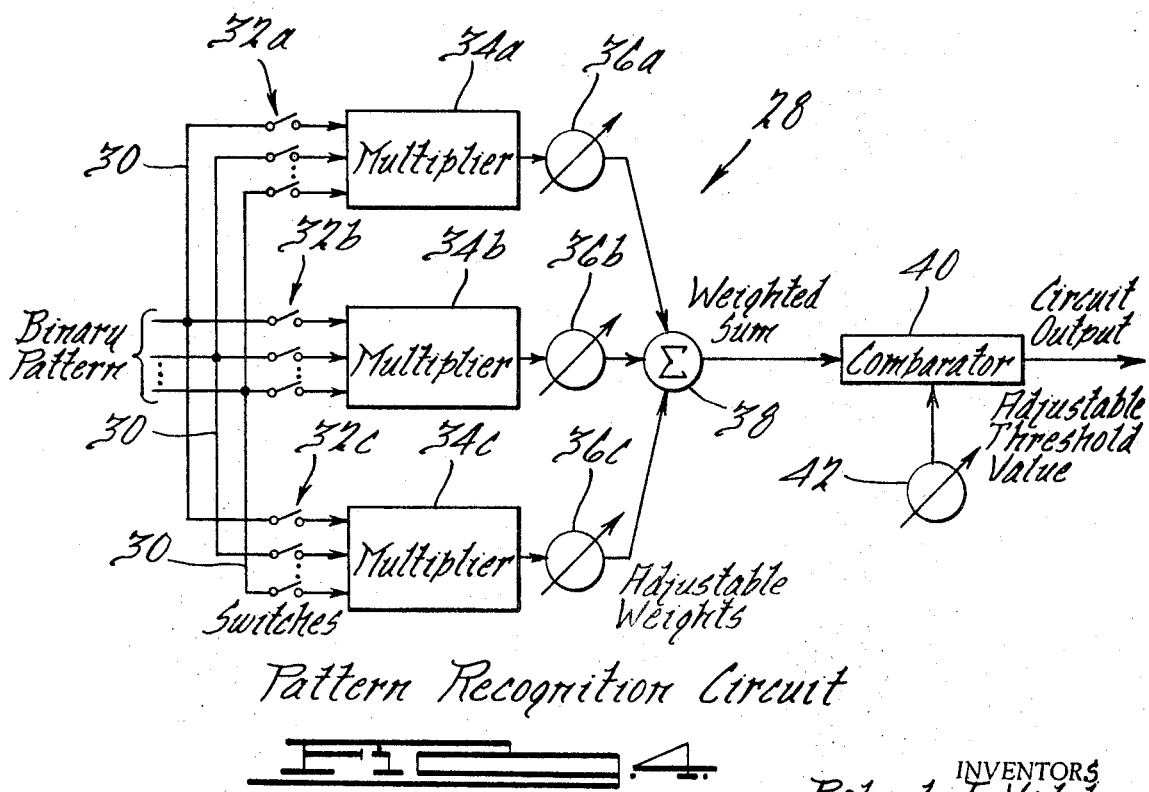
FIG. 4 is a schematic diagram of a pattern recognition circuit used in the pattern recognition network of FIG. 3.

In FIG. 4, a typical pattern recognition circuit 28 is shown in detail. The pattern recognition circuit 28 has a plurality of conductors 30 for transmitting the binary input pattern to sets of individually operative switches 32. Multipliers 34 are provided to receive the output of switches 32 and provide a cross product of the binary input pattern bits selected by switches 32. The output of each multiplier is connected to an adjustable weighting device 36 and in turn to a summing device 38 which provides the sum of all of the weighted cross products. The output of the summing device is then compared by comparator 40 with a threshold value provided by the adjustable threshold device 42. If the weighted sum is greater than the threshold value, the comparator will provide a one as its output; if the magnitude of the weighted sum is less than the threshold value, the output will be a zero.

In view of the foregoing description of the pattern recognition circuit, it will be understood that cross products of the selected bits are first formed according to the rule that the produce is a one if the selected bits containing even numbers of ones; otherwise it is a zero. Each product is then multiplied by a stored weight using the convention that a cross product of the binary value of one or zero corresponds respectively to the algebraic values of $+1$ and $-1$. The sum of the weighted bits is then computed and is compared to a stored threshold value. When the sum is greater than or equal to the threshold, the circuit produces a one output; otherwise, it produces a zero output.

The pattern recognition circuit described above is known as a nonlinear threshold circuit. It has the particular advantage of being trainable. That is, it can be made to perform a plurality of functions by the adjustments of the weights, switches and threshold values. The particular settings of the adjustable devices and switches may be determined from experimental data. A pattern recognition circuit of this type is disclosed in an article in Electronics, Aug. 22, 1966, Pages 86—93, entitled "Training a Machine to Read with NonLinear Threshold Logic." In this manner, the computer may be used to control a plurality of process types by recalibration for each process.

The pattern recognition circuit described above may be suitably replaced by other pattern recognition circuits such as those described in the test of George S. Sebestyen entitled "Decision Making Processes In Pattern Recognition," Macmillan Company, 1962; Sze-Tseh Hu entitled "Threshold Of Logic," University of California Pres., 1965; and J. K. Hawkins entitled "Self-Organizing Systems, A Review and Commentary, Proceeding of the IRE," Jan. 1961.

In FIG. 5, a linear regression circuit 44 is shown. Linear regression network 24 is provided with a linear regression circuit 44 for each class. The switching circuit 25 (FIG. 2) acts to connect the measured parameters to the linear regression circuit 44 designated by the classification code.

Each linear regression circuit 44 is provided with a plurality of input conductors, each being associated with a measurable parameter, $P_1-P_m$. The measurable parameters are each weighted by its respective adjustable weighting device 48 along with an appropriate constant weighting factor $W_o$. The output of the adjustable weighting devices 48 are connected to a summing device 50 which provides an output signal representing the calculated performance parameter.

As will be understood by one skilled in the art, a parameter which is linearly related to a plurality of known parameters may be calculated by weighing each known parameter and taking the sum of the weighted parameters. That is, each of the known parameters may be multiplied by a weighting factor and added to the other weighted parameters to calculate the linearly related parameter. As will also be understood by one skilled in the art, the linear regression circuit described above accomplishes this mathematical operation.

As will be understood by one skilled in the art, the switching summing and weighting devices described herein are readily implemented through state-of-the-art devices.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. An apparatus for converting an input pattern formed by a set of measured parameters into an output signal representing a nonmeasured parameter where said pattern is capable of classification into one of a plurality of classes according to the relative magnitudes of said measured parameters and where each of said classes approximately correspond to a predetermined functional relationship between said measured parameters and said nonmeasured parameter comprising:

first network means for receiving said input pattern and classifying said pattern into one of said classes according to the relative magnitudes of said measured parameters and providing a classification signal indicative of said one class; and second network means for receiving said input pattern and said classification signal and for weighting and summing said parameters according to said classification code to provide said output signal representing said nonmeasured parameter.

2. The computer of claim 1 wherein said first network means is a pattern recognition network.

3. The computer of claim 2 wherein said pattern recognition network comprises:

quantizer means for converting said input signal into a binary pattern containing only significant data; and a plurality of pattern recognition circuits, each receiving said binary pattern and providing one portion of said classification signal.

4. The computer of claim 3 wherein said pattern recognition circuits are nonlinear threshold circuits.

5. The computer of claim 1 wherein said second circuit means weights and sums said measured parameters according to predetermined linear relationships.

6. A control system for optimizing a process performance parameter comprising:

a plurality of sensors operably associated with said process for measuring preselected measurable process parameters and for providing a signal representing the magnitudes of said parameters;

first network means for classifying said signal into one of a plurality of classes, each class corresponding to an approximated functional relationship between said signal and said performance parameter, said network providing a classification code signifying said one class;

second network means for receiving said signal and said code and for weighting and summing said signal according to said code to provide an output signal representing said performance parameter; and optimizing means for comparing said process parameter with a desired optimum parameter to an output signal representing process adjustments to optimize said performance parameter.

7. A control system of claim 6 wherein said classes correspond to approximated linear relationships.